United States Patent
Ali et al.

(10) Patent No.: US 8,824,821 B2
(45) Date of Patent: Sep. 2, 2014

(54) METHOD AND APPARATUS FOR PERFORMING USER INSPIRED VISUAL EFFECTS RENDERING ON AN IMAGE

(75) Inventors: Gazi Ali, Santa Clara, CA (US); Alexander Berestov, San Jose, CA (US); Chuen-Chien Lee, Pleasanton, CA (US)

(73) Assignee: Sony Corporation, Tokyo (JP)

( * ) Notice: Subject to any disclaimer, the term of this patent is extended or adjusted under 35 U.S.C. 154(b) by 776 days.

(21) Appl. No.: 13/073,772

(22) Filed: Mar. 28, 2011

(65) Prior Publication Data

US 2012/0249836 A1    Oct. 4, 2012

(51) Int. Cl.
*G06K 9/40* (2006.01)
*H04N 5/262* (2006.01)
*G06T 5/00* (2006.01)
*H04N 5/222* (2006.01)

(52) U.S. Cl.
CPC .............. *H04N 5/2621* (2013.01); *G06T 5/003* (2013.01); *G06T 2207/10028* (2013.01); *H04N 5/2226* (2013.01)
USPC .......................................... 382/254; 382/260

(58) Field of Classification Search
None
See application file for complete search history.

(56) References Cited

U.S. PATENT DOCUMENTS

| 6,249,285 | B1 | 6/2001 | Madden et al. |
| 7,668,377 | B2 | 2/2010 | Curti et al. |
| 7,702,136 | B2 | 4/2010 | Steinberg et al. |
| 7,711,201 | B2 | 5/2010 | Wong et al. |
| 8,391,627 | B1 * | 3/2013 | Worthington ................. 382/260 |
| 2003/0202120 | A1 | 10/2003 | Mack |
| 2007/0024614 | A1 * | 2/2007 | Tam et al. ..................... 345/419 |
| 2007/0036456 | A1 | 2/2007 | Hooper |
| 2008/0317379 | A1 | 12/2008 | Steinberg et al. |
| 2010/0183236 | A1 * | 7/2010 | Kang et al. .................... 382/260 |
| 2011/0234590 | A1 * | 9/2011 | Jones et al. ................... 345/426 |

FOREIGN PATENT DOCUMENTS

EP    1 049 045 A1    11/2000

* cited by examiner

*Primary Examiner* — Andrae S Allison
(74) *Attorney, Agent, or Firm* — Moser Taboada

(57) ABSTRACT

Method and apparatus for performing visual effects rendering on an image are described. User specifications are processed for at least one visual effect for the image. Scene analysis information associated with the image may be accessed, wherein the scene analysis information is based on the user specifications and indicates at least one pixel of the image for coupling with the at least one visual effect. The at least one pixel is accentuated using depth map information, wherein dimensions for the at least one pixel are determined in response to corresponding depth values of the at least one pixel. An output image is generated having at least one visual effect.

21 Claims, 9 Drawing Sheets

METHOD AND APPARATUS FOR PERFORMING USER INSPIRED VISUAL EFFECTS RENDERING ON AN IMAGE

BACKGROUND

1. Technical Field

Embodiments of the present invention generally relate to an image processing system and, more particularly, to a method and apparatus for performing visual effect rendering on an image.

2. Description of the Related Art

Multimedia devices, such as digital cameras, can capture images of various physical objects in a particular scene. Image quality can be affected by various factors, including: aperture size, lighting, color intensities, texture, processing power, memory space, and/or the like. In some cases, it is desirable to post-process an image to enhance image quality and/or achieve a desired expression of the image. Image post-processing techniques can modify some of the factors noted above when adding visual effects to the captured images.

For example, an image can be post-processed to reduce the depth of field in the image (e.g., in order to emphasize the foreground of the image). In another example, an image can be post-processed to add various special effects, such as a particularly defined bokeh, a particular blending of objects in the image, a particular animation effect across several images, and the like. In such post-processing tasks, a user must understand and use imaging processing tools to manually configure and apply various filters to the image in order to achieve the desired effect. This requires some level of expertise in the image processing tools being used, some knowledge of the filters being applied, as well as the capability to properly analyze the scene to apply the filters appropriately so as to achieve the desired effect. Thus, adding various special effects to an image during post-processing, such as various blur effects, can be a manual and disjointed process.

SUMMARY

Embodiments of the present disclosure generally include a method and apparatus for performing visual effect rendering on an image. User specifications are processed for at least one visual effect for the image. Scene analysis information associated with the image is accessed, wherein the scene analysis information is based on the user specifications and indicates at least one pixel of the image for coupling with the at least one visual effect. The at least one pixel is accentuated using depth map information, wherein dimensions for the at least one pixel are determined in response to corresponding depth values of the at least one pixel. The depth map of the image can be obtained using existing techniques. In some cases the depth map can be refined to produce a dense map to facilitate the effect rendering process. Finally an output image is generated having at least one visual effect.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and apparatus for performing visual effect rendering on an image are described. The effect can be 'bokeh' (blur), highlighting, aperture simulation, relighting etc. In some embodiments, an image processing tool is configured to receive input image(s), depth map information for the image(s), and user instructions as input. The user instructions can specify a type of effect to be applied to the images, as well as one or more characteristics of such effect. The image processing tool can automatically perform scene analysis on the image(s) to identify feature(s) and/or region(s) of interest relevant to the desired effect. The image processing tool can automatically enhance the regions(s) of interest and/or the identified feature(s) using the depth map information associated with the image(s). The image processing tool can then apply the desired effect on the image as enhanced using the depth map information to produce output image(s) having the desired effect and characteristics specified by the user. The image processing tool can apply various effects in this manner, including aperture simulation, superimposition of special patterns, creating animation effects across a sequence of images, adjusting the lighting of a scene in an image, and insertion of virtual character.

Figure 1:
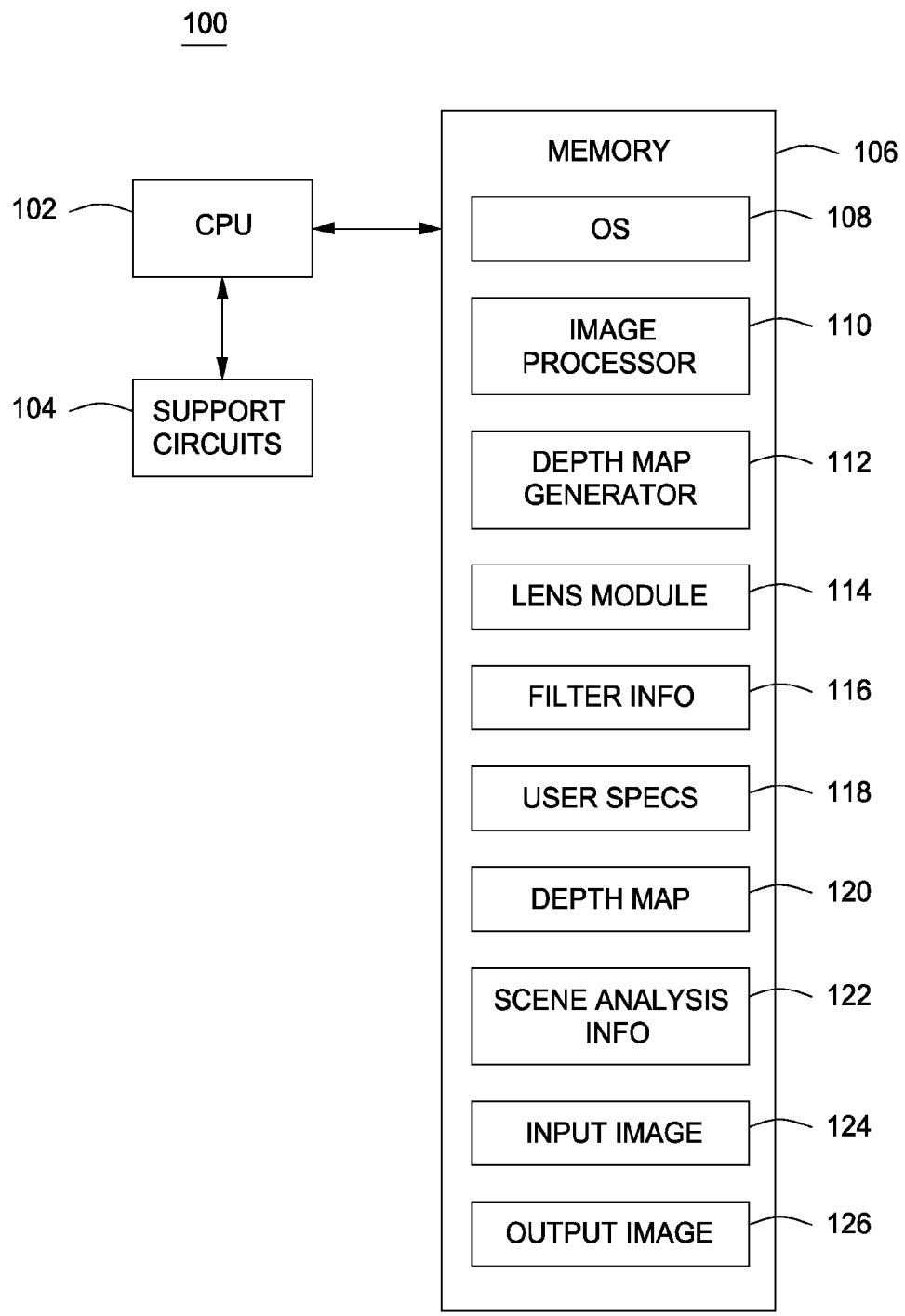
FIG. 1 is a block diagram of a computer for performing visual effect rendering on an image according to one or more embodiments.

FIG. 1 is a block diagram of a computer 100 for performing visual effect rendering on an image according to one or more embodiments. The computer 100 is a type of computing device (e.g., a laptop, a desktop, a Personal Digital Assistant (PDA), a digital camera, a video camera, a web camera and/or the like) known to one of ordinary skill in the art. The computer 100 comprises a CPU 102, support circuits 104 and a memory 106. The CPU 102 may comprise one or more commercially available microprocessors or microcontrollers that facilitate data processing and storage. Various support circuits 104 facilitate operation of the CPU 102 and may include clock circuits, buses, power supplies, input/output circuits and/or the like. The memory 106 includes a Read Only Memory, Random Access Memory, disk drive storage, optical storage, removable storage, and the like. The memory 106 includes various software packages, such as an operating system 108, image processing software 110, a depth map generator 112 and a lens module 114. The memory 106 also includes various data, such as filter information 116, user specifications 118, depth map information 120, scene analysis information 122, an input image 124 and an output image 126.

The operation system 108 generally manages various computer resources (e.g., network resources, data storage resources, file system resources and/or the like). The operating system 108 is configured to execute operations on one or more hardware and/or software components, such as network interface cards (NICs), hard disks, virtualization layers, firewalls and/or the like. For example, the various software packages call commands associated with the operating system 108 to perform various file system and/or storage operations, such as creating files or metadata, writing data to the files, reading data from the files, modifying metadata associated with the files and/or the like. The operating system 108 may call one or more functions associated with device drivers to execute these various file system and/or storage operations. As an example, the operating system 108 may utilize a device driver associated with a NIC card to communicate data to another computer and/or storage device as explained further below.

In some embodiments, the image processing software 110 includes processor-executable instructions for rendering visual effects (i.e., blur) on the input image 124 using the depth map information 120 and the scene analysis information 122. The image processing software 110 accentuates or highlights regions of interest of the input image 124 to facilitate further processing as described further below.

In some embodiments, the image processing software 110 performs aperture simulation, which refers to the aperture of a camera that controls an amount of light received for the input image 124. After the user specifies a shape, the image processing software 110 creates a binary mask based on the user defined shape. From the binary mask, a point spread function is created that represents the behavior of the image in response to a light source. For example, it represents how certain objects (e.g., ornaments on a tree) in the image reflect light. By applying the point spread function to the image, an output image is generated that includes the bokeh effects.

In some embodiments, the depth map generator 112 includes processor-executable instructions for estimating a depth for each pixel of the input image 124. The depth map generator 112 stores each depth value in the depth map information 120 at a location associated with the corresponding pixel.

In some embodiments, the depth map information 120 includes a dense depth map that is utilized by the image processing software to perform the blur rendering process. However, currently available techniques for depth map generation can only produce a coarse depth map having a reduced spatial resolution. In order to create the dense depth map, a refinement process is executed, such as those described with respect to U.S. non-provisional patent application Ser. No. 12/931,293, entitled "Method and apparatus for generating a dense depth map using an adaptive joint bilateral filter" and filed on Jan. 28, 2011, which is herein incorporated by reference in its entirety.

In some embodiments, the lens module 114 captures a beam of light comprising images for a left eye and a right eye respectively. The beam of light is captured from two different viewpoints that are horizontally displaced from each other. In some embodiments, the horizontal displacement between the two viewpoints is approximately 65 mm, an average distance between a person's eyes. The operation of the lens module 114 is discussed further with respect to the description of FIG. 2.

In some embodiments, the filter information 116 includes a binary mask having a shape defined by the user according to the user specifications 118 as described below. The mask may be a solid binary mask or a hollow binary mask where the hollow mask enhances the accentuated area of the input image 124. The filter information 116 also includes a point spread function (PSF) based on the binary mask, which is used to perform the aperture simulation. A blur radius for such a PSF is defined by the depth map information 120. In some embodiments, the filter information 116 includes a Guassian kernel (i.e., matrix) that, when applied to the input image 124, produces a low-pass, blurred image.

The user specifications 118 generally indicate a visual effect type and one or more visual effect attributes. In some embodiments, a user defines a shape for modifying a region of interest within the input image 124. After rendering the visual effect, the image processing software 110 produces the output image 126 as a result. For example, the user may instruct the image processing software 110 to add a "bokeh" effect to the region of interest in the shape of a star.

The input image 124 can be obtained from an image source (not shown) and is stored in the memory 106. According to some embodiments, the depth map information 120 includes a representation of the input image 124 in which a depth value is used to indicate a distance of a point (i.e., a pixel location) in the input image 124 from a focal plane. The focal plane can be any point in or out of the input image 124, but is typically located at a main object of the input image 124. Other points in the input image 124 are either more distant or less distant from the local plane. All pixels representing an object behind the focal plane (i.e., the background) are allocated a depth value representing a distance from the computer 100 (i.e. a camera). All pixels representing an object in front of the focal plane (i.e., the foreground) are allocated a depth value representing a distance from the computer 100 to the focal plane.

In response to the user specifications, the scene analysis information 122 expresses pixel locations for regions of interest within the input image 124 according to some embodiments. The regions of interest may include various image features (e.g., well-defined shapes or curves). The scene analysis information 122 also indicates each point source of light.

Figure 2:
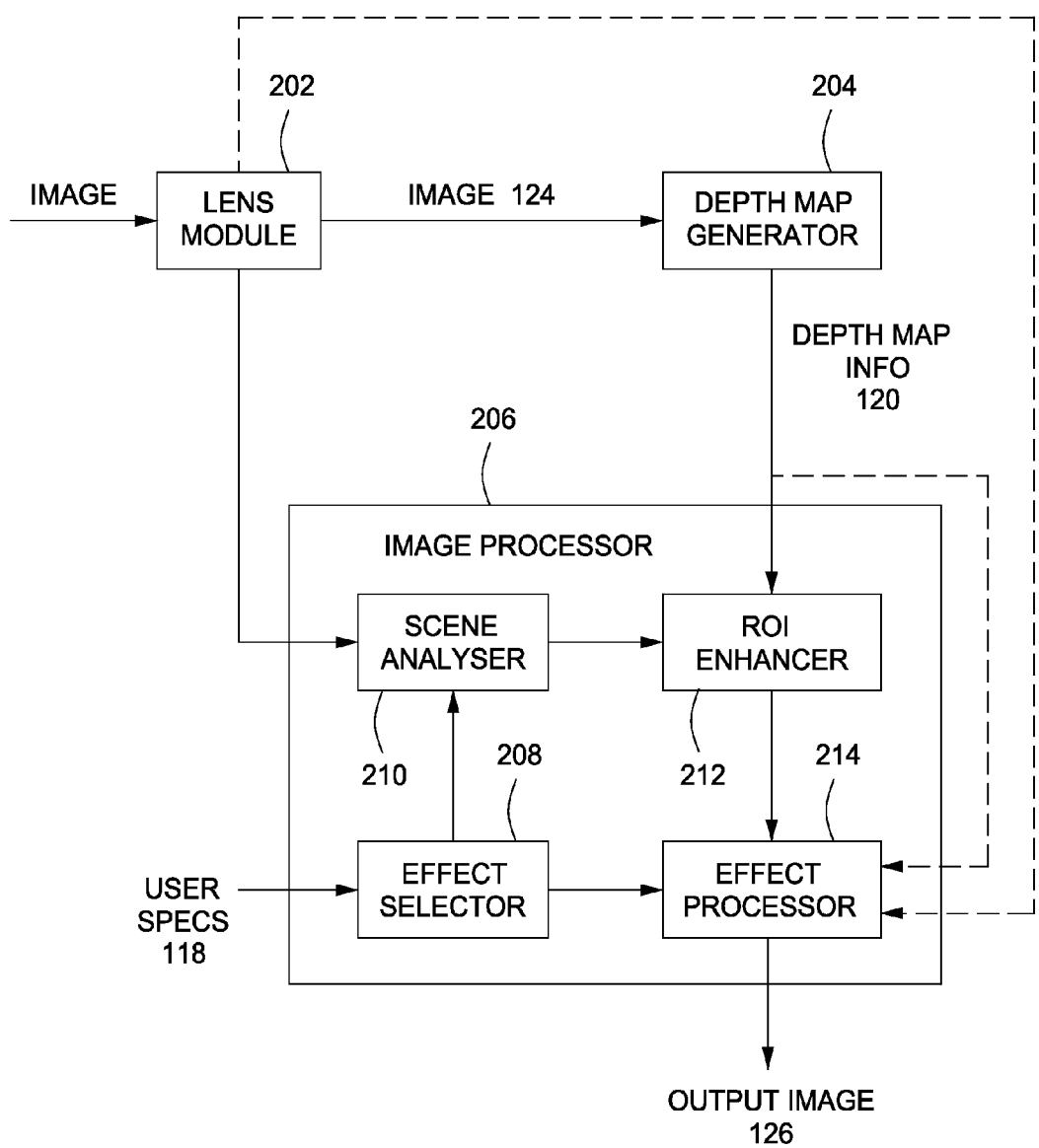
FIG. 2 is a functional block diagram of a system for performing visual effect rendering on an image according to one or more embodiments.

FIG. 2 is a functional block diagram of a system 200 for performing visual effect rendering on an image according to one or more embodiments. The system 200 includes a lens module 202, a depth map generator 204 and an image processor 206 where each is coupled to each other. The lens module 202 and the depth map generator 204 are circuits that perform a same functionality as the lens module 114 and the depth map generator 112 of FIG. 1 respectively.

In some embodiments, the image processor 206 includes various circuits, such as an visual effect selector 208, a scene analyzer 210, an ROI (region of interest) enhancer 212 and an effect processor 214. The effect selector 208 processes the user specifications 118 and identifies a visual effect that is selected for application on the input image 124. The scene analyzer 210 processes the input image 124 and identifies one or more regions of interest based on the identified visual effect. For example, if the user defined a specific shape for a "bokeh" effect, the scene analyzer 210 identifies the proper region for applying this visual effect.

In some embodiments, the ROI enhancer 212 processes locations for pixels within each identified region of interest within the input image 124. Using corresponding depth values from the depth map information 120, the ROI enhancer 212 subsequently accentuates these pixels in order to highlight the each identified region of interest. Enhancing the pixels within the one or more identified regions of interest facilitates application of the visual effect in a proper way.

The effect processor 214 applies the visual effect to the input image 124 and produces the output image 126. In some embodiments, the effect processor 214 creates a mask based on a user defined shape (e.g., a star, a heart and/or the like). In general, the binary mask is a two-dimensional representation of the user defined shape where each pixel has an intensity value of zero or one (i.e., color of white or black). Based on the binary mask, the effect processor 214 creates a point source function (PSF) to model effects of points on light on the input image 124. By applying the point source function, the effect processor 214 modifies the intensity values of the input image 124 and adds the visual effect, such as a bokeh effect. As a result, the output image 126 includes the visual effect.

The whole process in FIG. 2 can be described more generally in the following way, $$O(x_o, y_o) = \sum_{i=1}^{k} \sum_{j=1}^{k} f[h(x_i, y_j), I(x_i, y_j)]$$

here,
O=output pixel
$(x_o, y_o)$=spatial location of output pixel
f=function determined by effect selection
h=process on pixel determined by effect selection
(i,j)=Pixel location in the ROI or vicinity output pixel
I=Image content on the ROI or input image The output pixel, O, may refer to the vector representing intensity of color channels and the dimension of this vector can be arbitrary. The pixel location, (i,j), may be selected by scene analysis and ROI enchancer.

Figure 3:
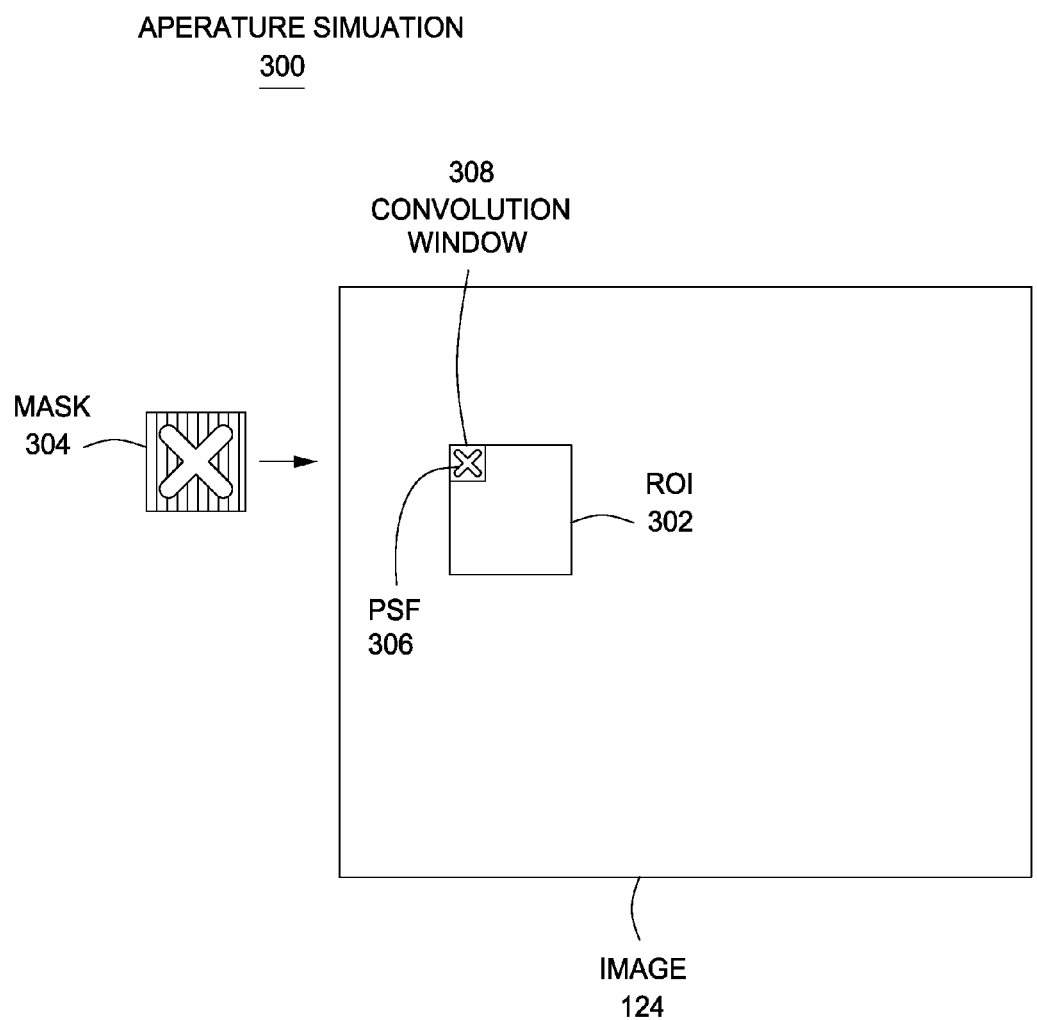
FIG. 3 illustrates aperture simulation on an image according to one or more embodiments.

FIG. 3 illustrates an example of aperture simulation 300 on the input image 124 according to one or more embodiments. The input image 124 includes one or more regions of interest, such as a region of interest 302, which have been identified by scene analysis information. By modifying intensity values for pixels within the region of interest 302 in proportion to corresponding depth values, the region of interest is accentuated.

In order to simulate an aperture shape, the user defines a shape (e.g., a heart, a star and/or the like) having certain dimensions. The user defined shape may need to be transformed into a mask 304, which is used to create a point spread function (PSF) 306. The mask 304 is a two-dimensional, binary representation of the user defined shape. In some embodiments, the mask 304 is a solid binary mask where inner portions of the user defined shape are in the foreground. Pixels within these portions have a value of one (1).

The PSF 306 generally refers to an irradiance distribution that results from a single point source in the image 124. The PSF 306 describes a response to a point source or point object. The PSF 306 includes an image of an individual object-plane impulse function, reflecting the fact that the point source of light in the object plane is spread out to form a finite area in the image. The size of the PSF is functionally related to the input depth map of the image. For example, the pixels located at larger depths (background) would have larger PSF compared to the pixels located in the foreground.

The PSF 306 is applied to the region of interest 302 by modifying the accentuated intensity values over numerous iterations. During each iteration, the PSF 306 modifies intensity values for pixels within a convolution window. Dimensions for the convolution window are proportional to the user defined shape.

Figure 4:
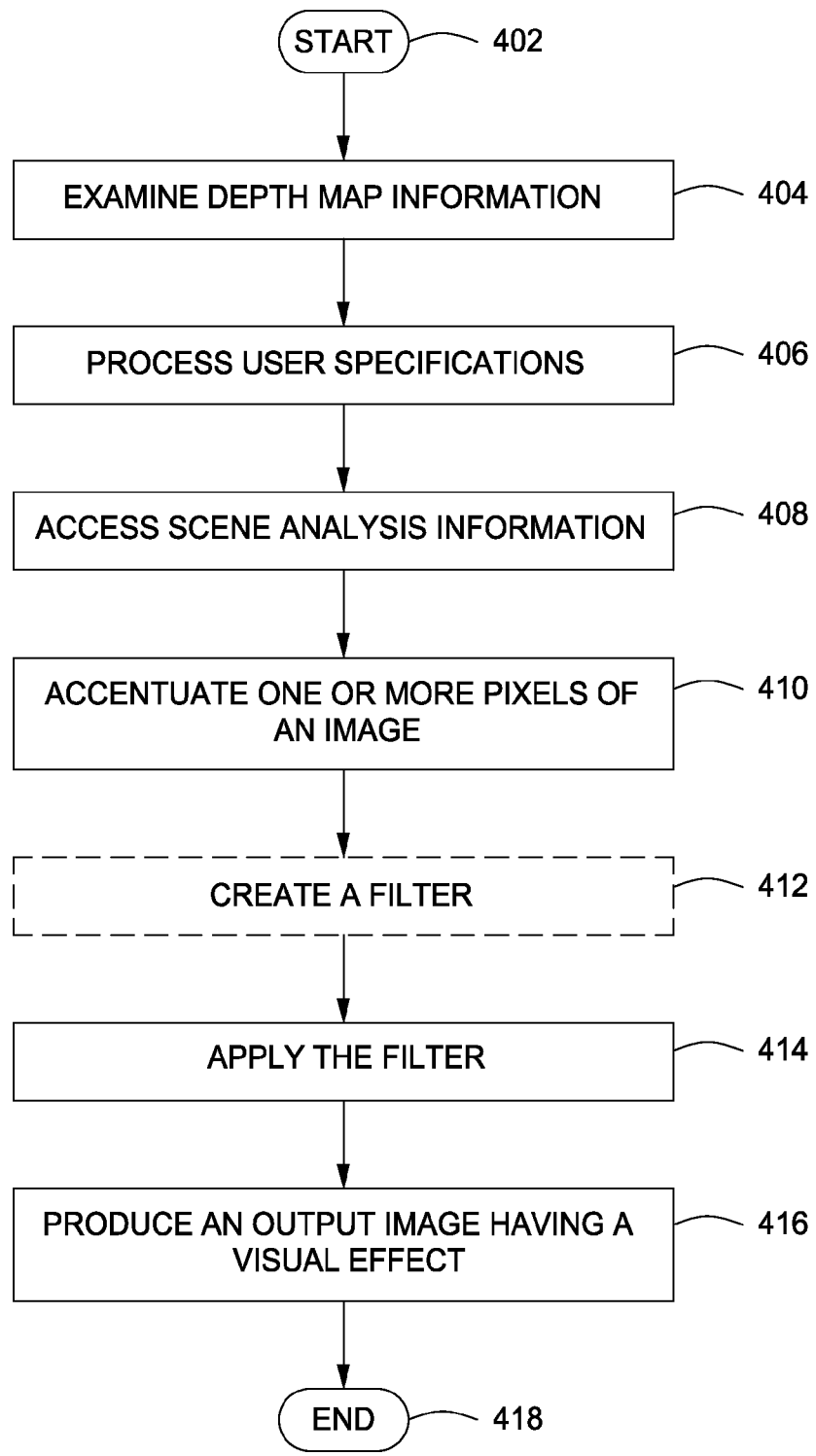
FIG. 4 is a flow diagram of a method of performing blur rendering on an image according to one or more embodiments.

FIG. 4 is a flow diagram of an example method 400 of performing blur rendering on an image according to one or more embodiments. The method 400 starts at step 402 and proceeds to step 404. At step 404, the method 400 examines depth map information. In some embodiments, the depth map information includes depth values that correspond with and reflect opacity of pixels within the image (e.g., the image 124 of FIG. 1). At step 406, the method 400 processes user specifications. The user specifications indicate a user defined shape and a visual effect selection. For example, in case of FIG. 4, the user may select the amount or degree of blur and/or the shape of the blur PSF.

At step 408, the method 400 accesses scene analysis information. The scene analysis information includes locations for one or more regions of interest. The one or more regions of interest are selected based on various information including a visual effect type, depth values and/or pixel information (i.e., intensity values).

At step 410, the method 400 accentuates one or more pixels of an image. Based on the scene analysis information, the method 400 identifies pixels within each region of interest. Based on corresponding depth values, the method 400 modifies intensity values for the identified pixels in order to highlight or enhance the one or more regions of interest according to some embodiments. Accordingly, the intensity values are increased or decreased to reflect opacity of the one or more regions of interest. In some embodiments, the method 400 changes intensity values of pixels around object boundaries to sharpen edges within the image. The method 400 also modifies intensity values for pixels within the regions of interest to distinguish between a foreground object and a background. For example, the method 400 applies one or more image enhancement techniques (e.g., contrast enhancement, edge enhancement, median filtering and/or the like) to the pixels within the one or more regions of interest.

At optional step 412, the method 400 creates a filter. In some optional embodiments, the method 400 creates a mask based on the user defined shape. Using the depth map information, the method 400 produces a point spread function that describes a two-dimensional distribution of light in a focal plane for each point source of light. A blur size associated with each point spread function depends on dimension of and/or a depth value of a corresponding point source of light. A detailed description for the creation of filter related to particular depth value is disclosed in United States non-provisional patent application Ser. No. 12/728,309, filed Mar. 22, 2010 and entitled "Blur Function Modeling for Depth of Field Rendering", is herein incorporated by reference. Alternatively, the method 400 creates a hollow mask from the initial solid mask by detecting edges of the user defined shape and dilating an inner portion until the hollow mask is closed.

At step 414, the method 400 applies the filter to add the visual effect and blur the regions of interest. In some embodiments, the point spread function is shifted to a location and scaled according to an intensity value of a corresponding point source. At step 416, the method 400 produces an output image having a visual effect. At step 400, the method ends.

Figure 5:
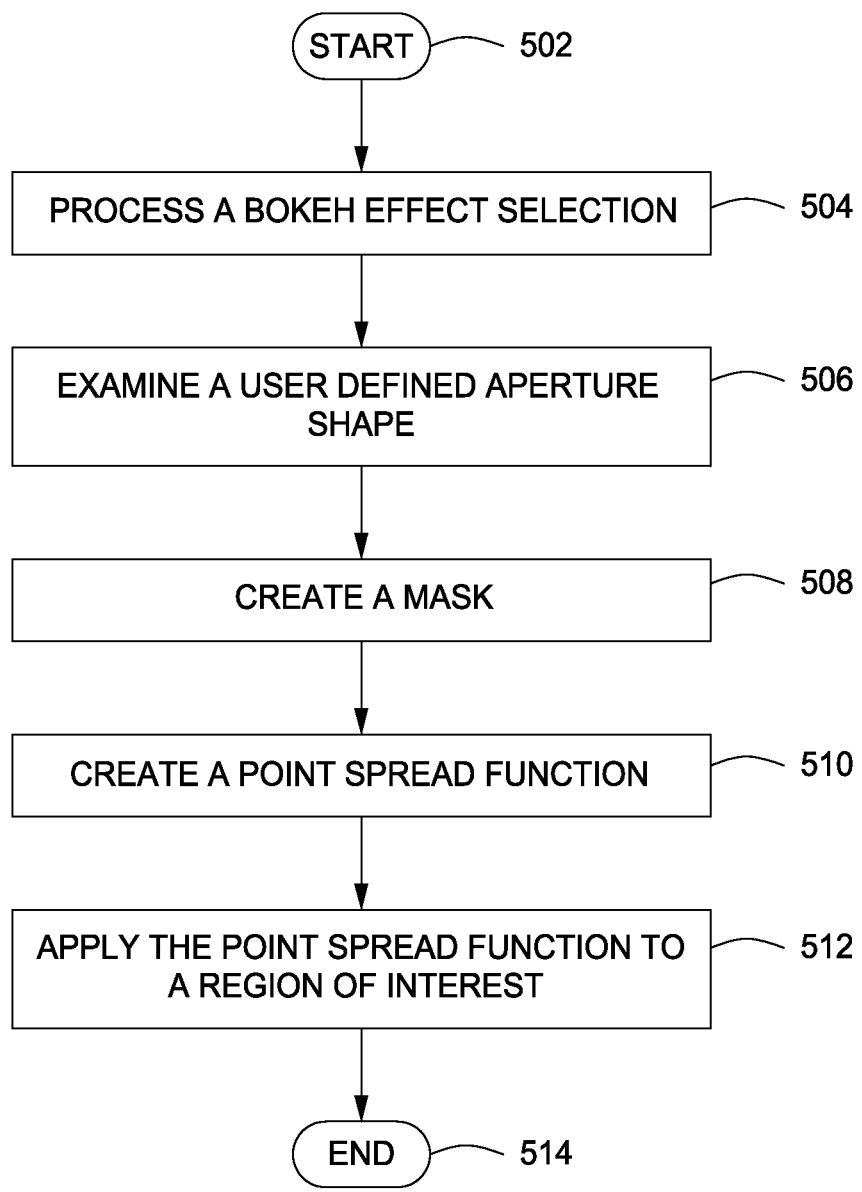
FIG. 5 is a flow diagram of a method of performing aperture simulation on an image according to one or more embodiments.

FIG. 5 is a flow diagram of a method 500 of performing aperture simulation on an image according to one or more embodiments. The aperture refers to a lens diaphragm opening that controls exposure of the image to light. A size of the opening affects a depth of field of the image. A shape of the opening affects a behavior of light. The method 500 starts at step 502 and proceeds to step 504.

At step 504, the method 500 processes a bokeh effect selection. In some embodiments, the user defines a shape and a size of the lens diaphragm opening (aperture) to be simulated. The user defined shape refers to the bokeh effect while the size refers to the depth of field of the image. The size may correspond with a particular aperture diameter (i.e., f-stops). At step 506, the method 500 examines the user defined shape for the bokeh effect. At step 508, the method 500 creates a binary mask. In some embodiments, the method 500 creates a solid binary mask of the user defined shape.

At step 510, the method 500 creates a point spread function (PSF) based on the mask. At step 512, the method 500 applies the point spread function to a region of interest. If the user selected aperture simulation, for example, the method 500 determines locations of each object that serves as a point source of light. Some of these objects reflect light projected from other objects. In some embodiments, the PSF is a two-dimensional matrix that models a spread or blur of a point source within the image. The point source may be a portion of a larger object. In some embodiments, the method 500 convolves the light sources with the PSF to produce an output image having the bokeh effect. During the convolving process, each PSF is shifted to a location and scaled according to intensity values of a corresponding point source of light. In some embodiments, the intensity values are further scaled according to corresponding depth values. For example, a far away object (e.g., a point source of light) that is further away is more blurry and has a higher opacity that an object that is nearer to a camera. Accordingly, the output image resulting from such a process includes a desired depth of field. At step 514, the method 500 ends.

Figure 6A:
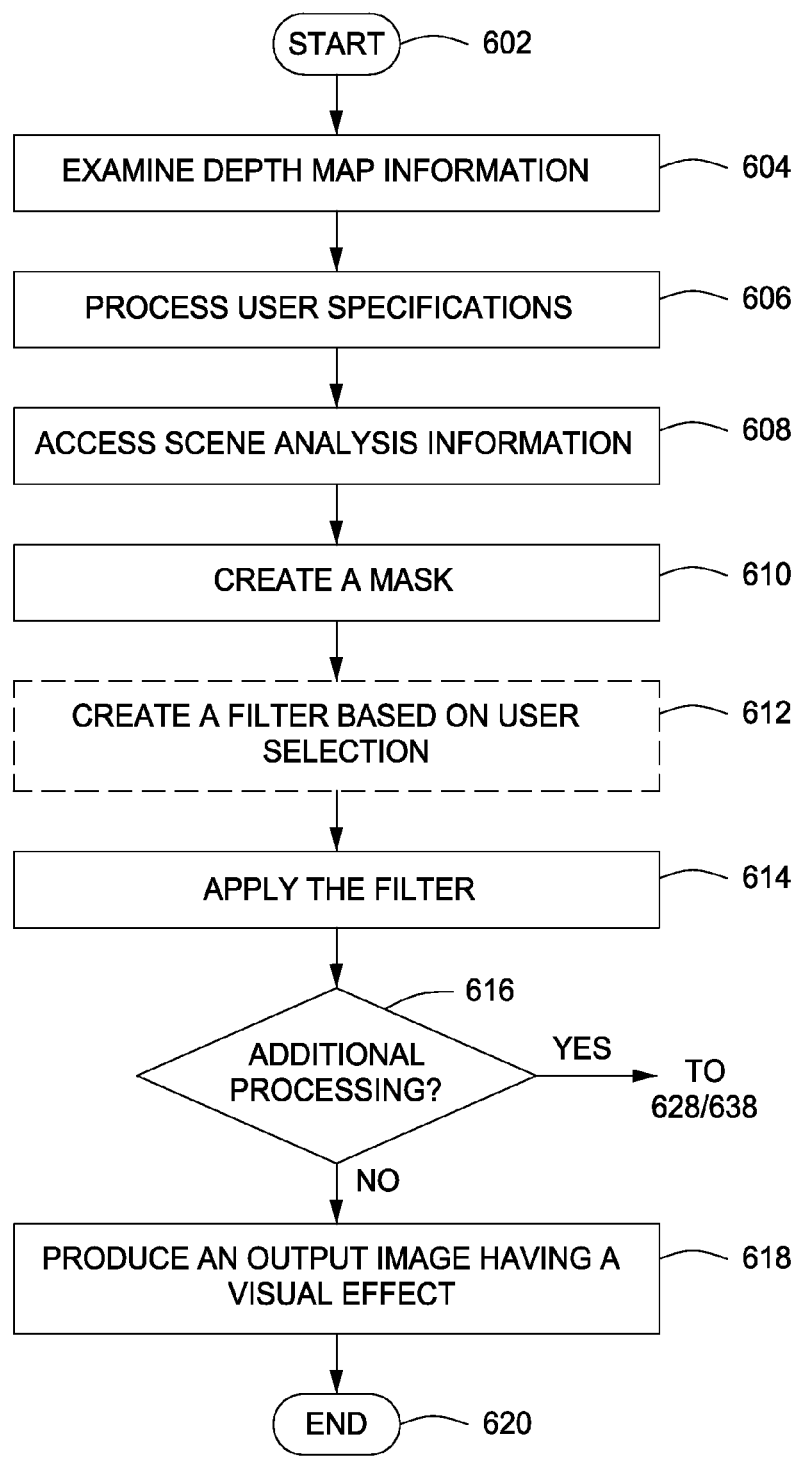
FIGS. 6A-C show a flow diagram of a method of modifying an image according to one or more embodiments.
Figure 6B:
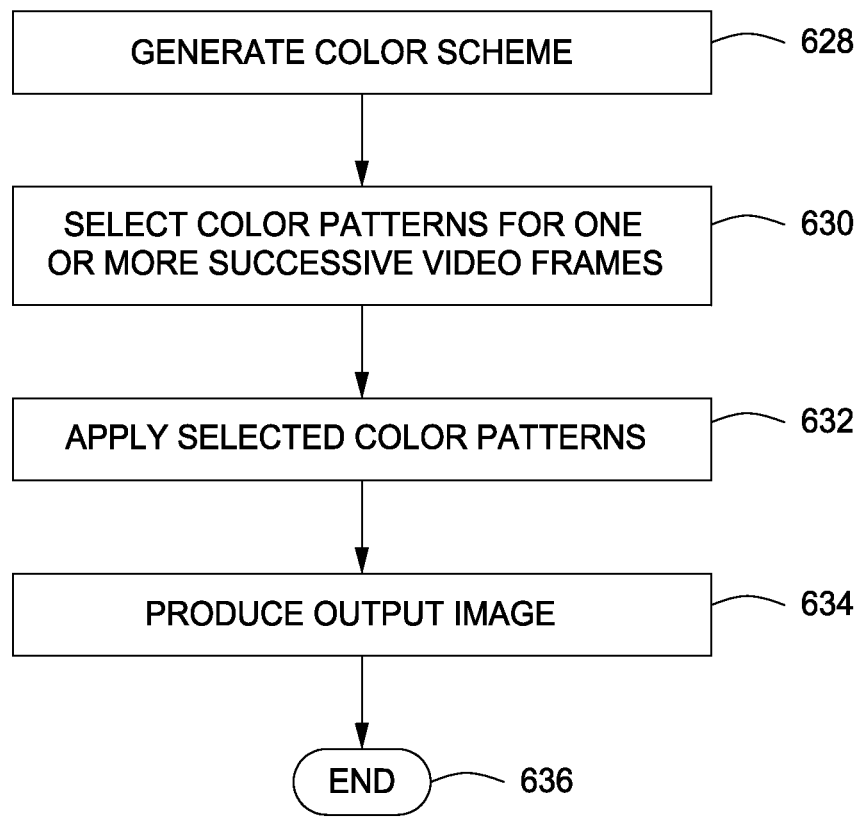
Figure 6C:
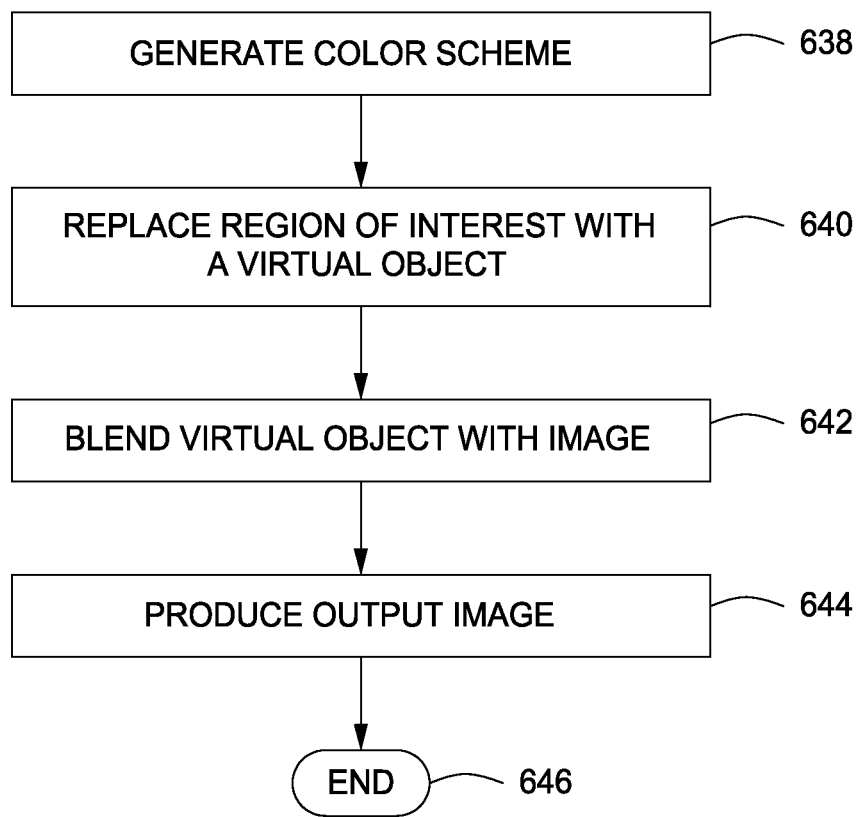

FIGS. 6A-C show a flow diagram of a method 600 of modifying an image using a sparse representation of a region of interest according to one or more embodiments. This example clearly demonstrates how the scene analyzer and the ROI enhancer module in FIG. 2 help better visual effect rendering. The method 600 starts at step 602 and proceeds to step 604. At step 604, the method 600 examines depth information.

At step 606, the method 600 processes the user specifications. Based on the user specification the method 600 creates the necessary filter and processes for rendering the required visual effect. A sparse representation of a region of interest.

At step 608, the method 600 selects one or more areas of the region of interest. Each area may refer to one or more sparse components. Here color information can be used. Typically, the color information is stored as a vector of intensity values for color components. A sparse representation of a region of interest is a more efficient representation than a pixel-based representation. A typical approach is to divide the image into a plurality of blocks where one or more blocks merge into at least one region of interest. If there is strong statistical correlation between two or more blocks, they can be represented as a superposition of a much smaller number of pre-identified components, (i.e., sparse components). Therefore, each region of interest is a sparse combination of known components.

At step 610, the method 600 processes a user defined shape and creates a mask. In some embodiments this mask can be a solid mask or a hollow mask. The mask can also be binary valued or multi-valued. The hollow mask can created from the solid mask. For example, at step 610, the method 600 detects edges in the solid mask and use dilation to create the hollow mask. Dilation refers to a process for connecting and expanding the detected edges to close the solid mask.

At step 612, the method 600 determines whether to apply a hollow mask or the solid mask. If the method 600 decides to apply the hollow mask, the method 600 proceeds to step 612. At step 612, the method 600 creates a filter representing the hollow mask. At step 614, the method 600 applies the hollow mask to the image.

If, on the other hand, the method 600 decides to apply the solid mask, the method 600 proceeds to step 612. But the filter produced at step 612 will be based on the solid mask. At step 614, the method 600 applies the solid mask to the image. At step 616, the method 600 determines whether to perform additional image processing. If the method 600 decides to perform animation, the method 600 proceeds to step 628. If the method 600 decides to perform visual object insertion, the method 600 proceeds to step 638. If, on the other hand, the method 600 decides not to perform any additional image processing, the method 600 proceeds to step 618. At step 618, the method 600 produces an output image. At step 620, the method 600 ends.

FIG. 6B illustrates steps for animating the image. At step 628, the method 600 generates a color scheme. At step 630, the method 600 selects color patterns for one or more successive video frames. At step 632, the method 600 applies the selected color patterns. At step 634, the method 600 produces the output image. At step 636, the method 600 ends.

Accordingly, modifying a color scheme for the input image 124 renders each object with a different color that a corresponding object in a successive video frame. With respect to a plurality of objects of the input image 124, a color scheme 406 indicates color information for the plurality of objects. Each object within the input image 124 and the successive video frames is a region of interest as identified during scene analysis. For example, the input image may illustrate a tree with numerous ornaments on the input image 124, a first successive video frame and a second successive video frame. In order to perform the animation, colors for each ornament alternate in each successive video frame. For example, the ornaments may alternate between a first color, such as red, and a second color, such as blue.

FIG. 6C illustrates steps for inserting a visual object. At step 638, the method 600 generates a color scheme. At step 640, the method 600 replaces the region of interest with a virtual object. At step 642, the method 600 blends the virtual object with the image. At step 644, the method 600 produces the output image. At step 646, the method 600 ends.

Figure 7:
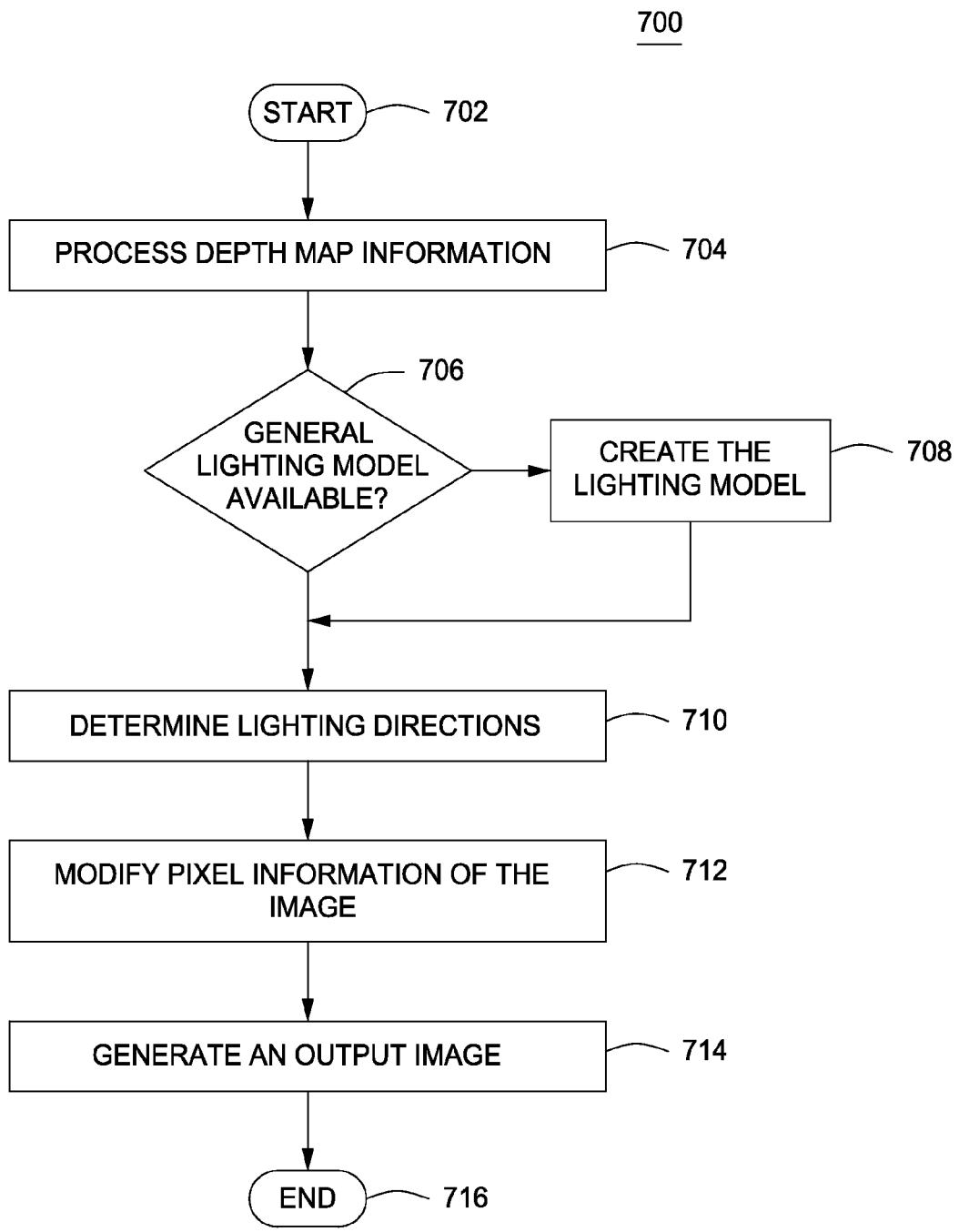
FIG. 7 is a flow diagram of a method of relighting an image according to one or more embodiments.

FIG. 7 is a flow diagram of a method 700 of relighting an image according to one or more embodiments. The method 700 starts at step 702 and proceeds to step 704. At step 704, the method 700 processes depth map information.

At step 706, the method 700 determines whether a general lighting model is available. If the method 700 determines that there is an available lighting model, the method 700 proceeds to step 710. If the method 700 determines otherwise, the method 700 proceeds to step 708. At step 708, the method 700 creates the lighting model.

At step 710, lighting directions are determined. At step 712, the method 700 modifies pixel information. At step 714, the method 700 produces an output image. At step 716, the method 700 ends.

While the foregoing is directed to embodiments of the present invention, other and further embodiments of the invention may be devised without departing from the basic scope thereof, and the scope thereof is determined by the claims that follow.

The invention claimed is:

1. A method of performing visual effect rendering on an image, comprising:
processing user specifications for at least one visual effect for the image to generate, in part, scene analysis information comprising at least a point source of light, wherein the user specifications comprise at least in part a shape definition;
accentuating at least one pixel contained in the shape definition using depth map information and the scene analysis information, wherein characteristic for the at least one pixel are determined in response to corresponding depth values of the at least one pixel; and generating an output image having at least one visual effect.

2. The method of claim 1, wherein generating the output image further comprising:
creating a mask for the shape definition; and
creating a point spread function for the at least one pixel based on the mask,
wherein the shape definition defines an aperture shape.

3. The method of claim 2, wherein a size of the mask depends on the corresponding depth values of the at least one pixel.

4. The method of claim 1, wherein the at least one pixel forms at least one region of interest.

5. The method of claim 1, wherein generating the output image further comprises creating a filter having at least one convolution window size that is related to the corresponding depth values of the at least one pixel.

6. The method of claim 1, wherein accentuating the at least one pixel using the depth map information further comprises applying at least one image enhancement technique to the at least one pixel.

7. The method of claim 1, further comprising:
identifying a region of interest within the image based on color information;
creating a sparse representation of the region of interest; and
selecting at least one area of the sparse representation of the region of the interest using the depth map information.

8. The method of claim 7 further comprising:
superimposing a user defined shape on the at least one selected area to produce the output image; and
blurring the output image using the depth map information.

9. The method of claim 7, wherein processing the filter for the at least one visual effect further comprises creating a hollow mask based on a user defined shape for convolving with the region of interest.

10. The method of claim 9, wherein creating the hollow mask further comprising:
applying a solid mask on the region of interest to detect at least one edge; and
dilating the region of interest to which the solid mask was applied with respect to at least one detected edge.

11. The method of claim 7 further comprising:
generating a color scheme based on the scene analysis information;
selecting color patterns for successive video frames; and
applying the color patterns that were selected to the region of interest.

12. The method of claim 7 further comprising:
generating a color scheme based on the scene analysis information;
replacing the region of interest with a virtual object; and
blending the virtual object into the image.

13. The method of claim 12, wherein blending the virtual object further comprises modifying a size of the virtual object based on the depth map information.

14. The method of claim 1, wherein the scene analysis information is based on the user specifications and indicates at least one pixel of the image for coupling with the at least one visual effect.

15. The method of claim 1 further comprising:
creating a lighting model based on the depth map information;
determining at least one lighting direction from at least one light source based on the scene analysis information; and
relighting the image using the lighting model and the at least one lighting direction.

16. The method of claim 15, wherein relighting the image further comprises modifying the at least one pixel using the lighting model and the at least one lighting direction.

17. An apparatus for performing visual effect rendering on an image, comprising:
means for processing user specifications for at least one visual effect for the image to generate, in part, scene analysis information comprising at least a point source of light, wherein the user specifications comprise at least in part a shape definition;
means for accentuating at least one pixel contained in the shape definition using depth map information and the scene analysis information, wherein dimensions for the at least one pixel are determined in response to corresponding depth values of the at least one pixel; and
means for generating an output image having at least one visual effect.

18. The apparatus of claim 17, wherein the means for generating the output image further comprises:
means for creating a mask for the shape definition; and
means for creating a point spread function for the at least one pixel based on the mask,
wherein the shape definition defines an aperture shape.

19. The apparatus of claim 17, further comprising:
means for identifying a region of interest within the image based on color information;
means for creating a sparse representation of the region of interest; and
means for selecting at least one area of the sparse representation of the region of the interest using the depth map information,
wherein the scene analysis information is based on the user specifications and indicates at least one pixel of the image for coupling with the at least one visual effect.

20. An apparatus, comprising:
a lens module configured to obtain an image; and
a depth map generator configured to:
process user specifications for at least one visual effect for the image to generate, in part, scene analysis information comprising at least a point source of light, wherein the user specifications comprise at least in part a shape definition;
accentuate at least one pixel contained in the shape definition using depth map information and the scene analysis information, wherein characteristic for the at least one pixel are determined in response to corresponding depth values of the at least one pixel; and
generate an output image having at least one visual effect.

21. The apparatus of claim 20, wherein the depth map generator is further configured to:
identify a region of interest within the image based on color information;
create a sparse representation of the region of interest; and
select at least one area of the sparse representation of the region of the interest using the depth map information.

* * * * *